(12) United States Patent
Kunori et al.

(10) Patent No.: US 8,271,890 B2
(45) Date of Patent: Sep. 18, 2012

(54) IMAGE PROCESSING APPARATUS, METHOD OF CONTROLLING THE SAME, AND STORAGE MEDIUM

(75) Inventors: Shiro Kunori, Yokohama (JP); Nobuaki Fukasawa, Tokyo (JP)

(73) Assignee: Canon Kabushiki Kaisha (JP)

( * ) Notice: Subject to any disclaimer, the term of this patent is extended or adjusted under 35 U.S.C. 154(b) by 195 days.

(21) Appl. No.: 12/614,874

(22) Filed: Nov. 9, 2009

(65) Prior Publication Data

US 2010/0122187 A1    May 13, 2010

(30) Foreign Application Priority Data

Nov. 10, 2008    (JP) .................................. 2008-287768

(51) Int. Cl.
*G06F 3/00*    (2006.01)
(52) U.S. Cl. ........................... 715/762; 715/810; 399/81
(58) Field of Classification Search ........................ None
See application file for complete search history.

(56) References Cited

U.S. PATENT DOCUMENTS

| 2002/0015598 | A1* | 2/2002 | Maeda et al. ................... 399/81 |
| 2002/0063697 | A1 | 5/2002 | Amano |
| 2006/0161889 | A1 | 7/2006 | Stabb et al. |
| 2007/0028187 | A1* | 2/2007 | Katsuyama ................... 715/810 |
| 2008/0267654 | A1* | 10/2008 | Kawai ............................. 399/81 |
| 2008/0307302 | A1 | 12/2008 | Amano |

FOREIGN PATENT DOCUMENTS

| JP | 2002-132100 A | 5/2002 |
| JP | 2007-041725 A | 2/2007 |
| KR | 1020050106688 A | 11/2005 |
| KR | 1020070032142 A | 3/2007 |

OTHER PUBLICATIONS

Extended European Search Report issued in corresponding European Patent Application No. 09175554.6 dated Feb. 26, 2010.
KR Office Action issued Jun. 21, 2012 for corresponding KR10-2009-0106297.

* cited by examiner

*Primary Examiner* — Boris Pesin
*Assistant Examiner* — Ayesha Huertas Torres
(74) *Attorney, Agent, or Firm* — Rossi, Kimms & McDowell LLP

(57) ABSTRACT

An image processing apparatus which makes it possible to realize easy accessing of registered information of any function and provide a user interface having high operability. The image processing apparatus stores setting information configured via an operating section and access information for use in accessing the setting information in association with each other. Further, the image processing apparatus stores the setting information and button information in association with each other. The button information is displayed on a touch panel in a user selectable form. When an item of the button information displayed on the touch panel is selected by a user, a portal application detects the access information associated with the selected button information item. The setting information is acquired based on the detected access information. The image processing apparatus performs image processing based on the acquired setting information.

8 Claims, 15 Drawing Sheets

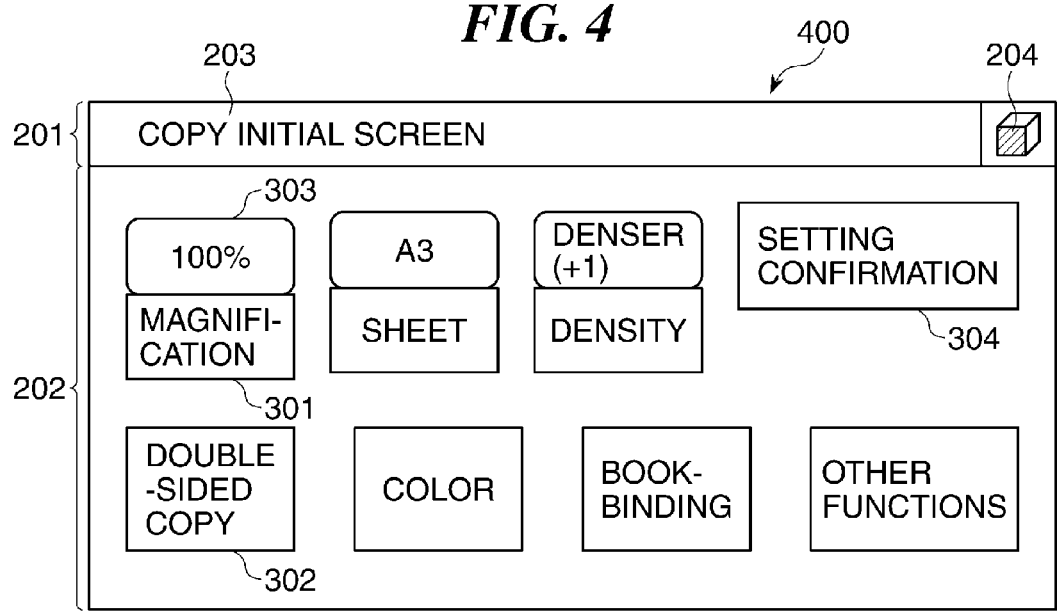
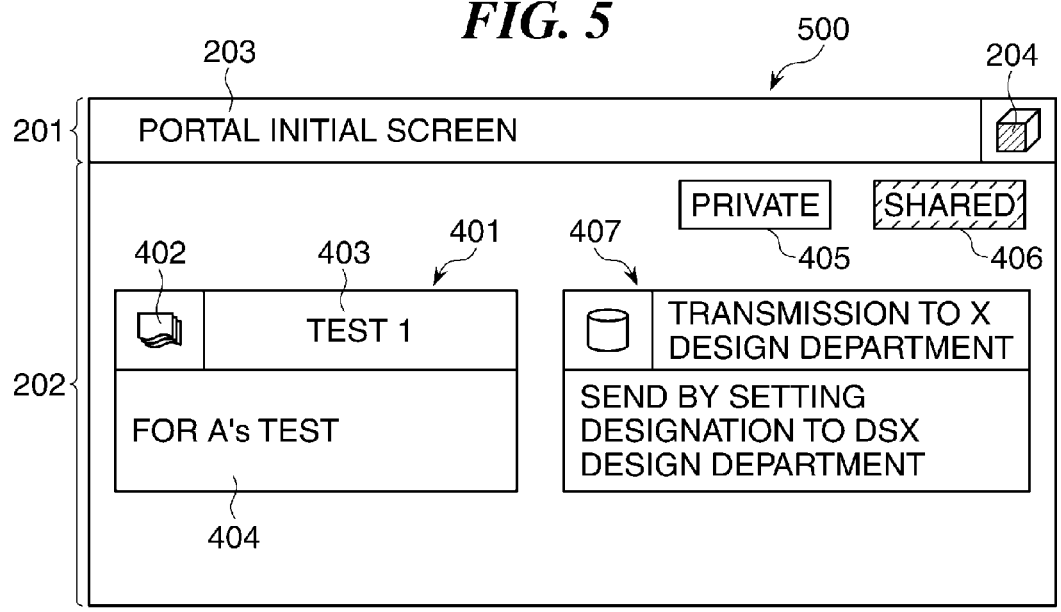

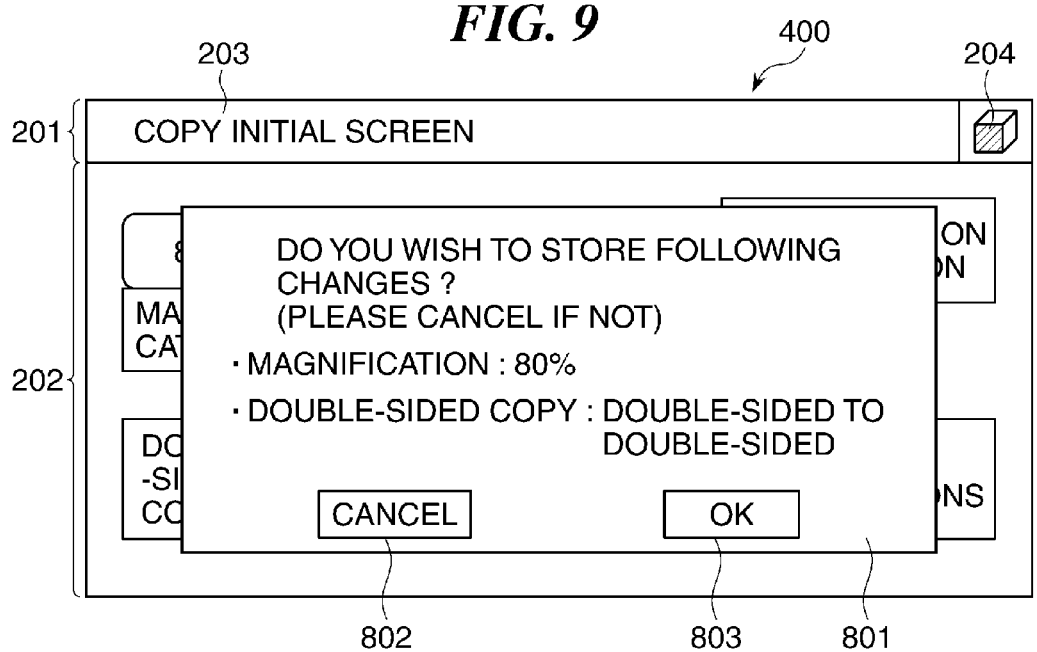
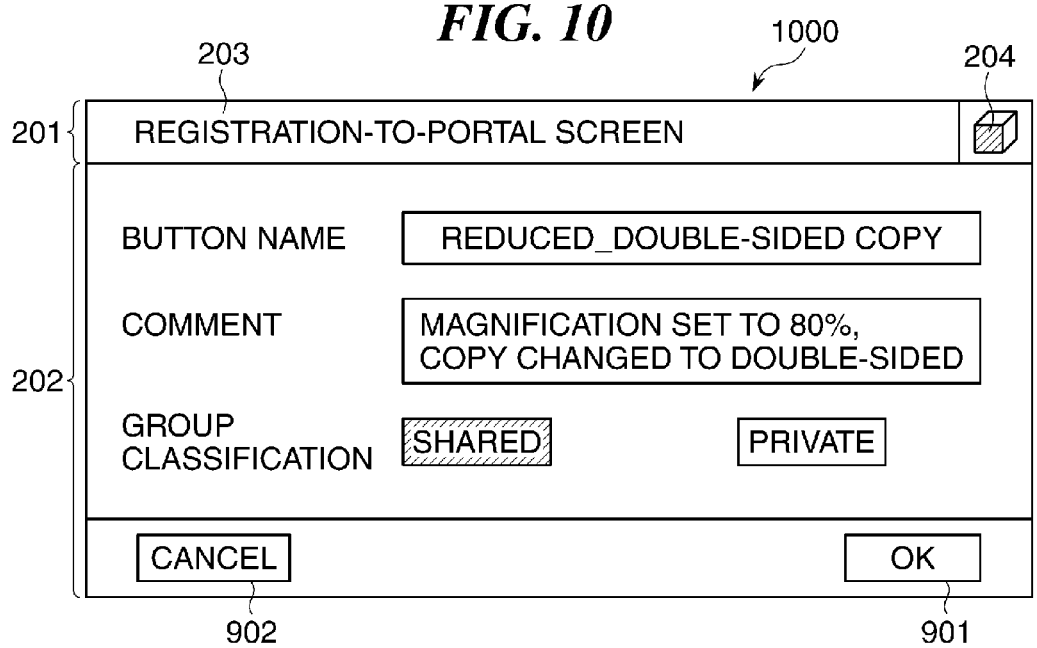

FIG. 11

| PORTAL BUTTON NO. | APPLICATION ID | ACTION ID | ICON INFORMATION | BUTTON INFORMATION (NAME/COMMENT/GROUP) |
|---|---|---|---|---|
| 1 | 100 | 1 | copy.bmp | TEST 1/ FOR A's TEST/ SHARED |
| 2 | 100 | 2 | copy.bmp | TEST 2/ FOR B's TEST/ PRIVATE (userID:0001) |
| 3 | 101 | 1 | send.bmp | TRANSMISSION TO X DESIGN DEPARTMENT/ SEND BY SETTING DESIGNATION TO DSX DESIGN DEPARTMENT/ SHARED |
| 4 | 100 | 3 | copy.bmp | REDUCED_DOUBLE-SIDED COPY/ MAGNIFICATION SET TO 80%, AND COPY CHANGED TO DOUBLE-SIDED/ SHARED |

| ACTION ID | ICON INFORMATION | SETTING INFORMATION |
|---|---|---|
| 1 | copy.bmp | ENTRY: 10, DENSITY: +3, BOOKBINDING ON, ... |
| 2 | copy.bmp | NUMBER OF COPIES: 5, COLOR: AUTO, STAPLING: UPPER LEFT |
| 3 | copy.bmp | MAGNIFICATION 80, DOUBLE-SIDED COPY: DOUBLE-SIDED TO DOUBLE-SIDED |

FIG. 14

| PORTAL BUTTON NO. | APPLICATION ID | ACTION ID | ICON INFORMATION | BUTTON INFORMATION (NAME/COMMENT/GROUP) |
|---|---|---|---|---|
| 1 | 100 | 1 | copy.bmp | TEST 1/<br>FOR A's TEST/<br>SHARED |
| 2 | 100 | 2 | copy.bmp | TEST 2/<br>FOR B's TEST/<br>PRIVATE (userID:0001) |
| 3 | 101 | 1 | send.bmp | TRANSMISSION TO X DESIGN DEPARTMENT/<br>SEND BY SETTING DESIGNATION TO DSX DESIGN DEPARTMENT/<br>SHARED |

FIG. 17

```
START
  ↓
RECEIVE EXECUTION COMMAND — S1601
  ↓
SET CURRENT SETTINGS TO DEFAULT — S1602
  ↓
RETURN TO COPY INITIAL SCREEN — S1603
  ↓
REFLECT SETTING INFORMATION ASSOCIATED WITH ACTION ID — S1604
  ↓
END
```

FIG. 18

| ACTION ID | ICON INFORMATION | SETTING INFORMATION |
|---|---|---|
| ... | ... | ... |
| 3 | copy.bmp | PRESS MAGNIFICATION SETTING BUTTON |
| | | PRESS 80% BUTTON |
| | | PRESS CLOSE BUTTON |
| | | PRESS DOUBLE-SIDED COPY-SETTING BUTTON |
| | | PRESS DOUBLE-SIDED COPY TO DOUBLE-SIDED COPY BUTTON |
| | | PRESS CLOSE BUTTON |

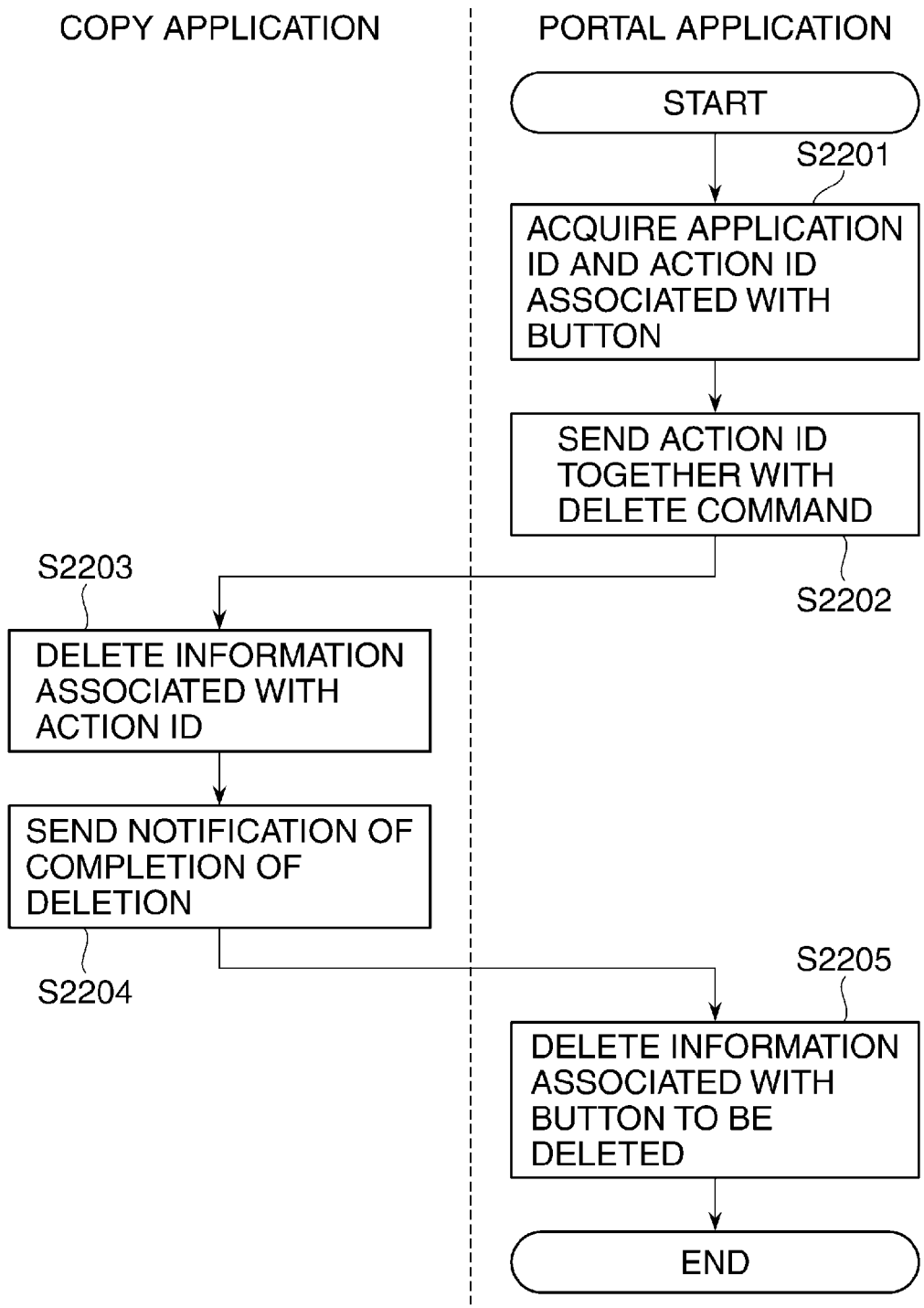

IMAGE PROCESSING APPARATUS, METHOD OF CONTROLLING THE SAME, AND STORAGE MEDIUM

BACKGROUND OF THE INVENTION

1. Field of the Invention

The present invention relates to an image processing apparatus and a method of controlling the same, and more particularly to an image processing apparatus which enables a user to easily configure settings for the apparatus and a method of controlling the image processing apparatus.

2. Description of the Related Art

Recent image processing apparatuses have been becoming more and more sophisticated and more multifunctional, and therefore there is a user need for quick accessing of functions that are frequently used and for easy configuration of settings. For this reason, there has conventionally been proposed a technique in which function-assigned keys (short-cut keys) that are assigned desired functions and configuration processes, respectively, are displayed on a display section, and when a user selects one of the keys, an associated function or setting is reflected (see e.g. Japanese Patent Laid-Open Publication No. 2002-132100).

In the above-mentioned conventional technique using short-cut keys (hereinafter referred to as "the short-cut function"), the data format of the functions and the settings is required to conform to a format that enables the functions and the settings to be stored in association with the short-cut keys, since an image processing apparatus stores functions and settings in association with respective short-cut keys.

On the other hand, the number of functions operable from an image processing apparatus can be increased by installing an application equipped with the desired functions. However, unless the data format of the functions in the application is adapted to the short-cut function, the functions and settings in the application cannot be associated with the respective short-cut keys, and hence it is impossible to use the short-cut function. To solve this problem, there has been proposed a method in which application-specific scripts are generated and each of the scripts is parsed by the short-cut function to thereby execute data of functions in the application.

However, in the conventional method, it is required to provide parsers associated with the respective scripts, and it takes time to parse a script.

SUMMARY OF THE INVENTION

The present invention provides an image processing apparatus which makes it possible to realize easy accessing of registered information of any function and provide a user interface having high operability, a method of controlling the image processing apparatus, and a storage medium storing a program for implementing the method.

In a first aspect of the present invention, there is provided an image processing apparatus including an operation unit and a display unit, comprising a first storage unit configured to store setting information configured via the operation unit and access information for use in accessing the setting information in association with each other, a second storage unit configured to store the access information and button information in association with each other, a display control unit configured to display the button information on the display unit in a user selectable form, an access information-detecting unit configured to be operable when the button information displayed on the display unit is selected by a user, to detect the access information associated with the button information in the second storage unit, a setting information acquisition unit configured to acquire the setting information associated with the access information from the first storage unit, based on the access information detected by the access information-detecting unit, and an execution unit configured to execute image processing based on the setting information acquired by the setting information acquisition unit.

In a second aspect of the present invention, there is provided a method of controlling an image processing apparatus including an operation unit and a display unit, comprising storing setting information configured via the operation unit and access information for use in accessing the setting information in a first storage unit in association with each other, storing the access information and button information in a second storage unit in association with each other, displaying the button information on the display unit in a user selectable form, detecting, when the button information displayed on the display unit is selected by a user, the access information associated with the button information in the second storage unit, acquiring the setting information associated with the access information from the first storage unit, based on the detected access information, and performing image processing based on the acquired setting information.

In a third aspect of the present invention, there is provided a storage medium storing a computer-readable program for causing a computer to execute a method of controlling an image processing apparatus including an operation unit and a display unit, wherein the method comprises storing setting information configured via the operation unit and access information for use in accessing the setting information in a first storage unit in association with each other, storing the access information and button information in a second storage unit in association with each other, displaying the button information on the display unit in a user selectable form, detecting, when the button information displayed on the display unit is selected by a user, the access information associated with the button information in the second storage unit, acquiring the setting information associated with the access information from the first storage unit, based on the detected access information, and performing image processing based on the acquired setting information.

According to the present invention, it is possible to realize easy accessing of registered information of any function. Further, since it is not required to parse a script or the like, accessing can be performed at a high speed. Furthermore, the present invention makes it possible to provide a user interface having high operability.

Further features of the present invention will become apparent from the following description of embodiments (with reference to the attached drawings).

BRIEF DESCRIPTION OF THE DRAWINGS

FIG. 4 is a view of an example of a copy initial screen.

FIG. 5 is a view of an example of a portal initial screen.

FIG. 9 is a view of an example of a confirmation dialog displayed by the copy application.

FIG. 10 is a view of an example of a registration-to-portal screen.

FIG. 11 is a diagram of an example of table information stored in a storage area for a portal application in a HDD.

FIG. 14 is a diagram of an example of table information stored in the storage area for the portal application before registration of the portal button 4.

FIG. 17 is a flowchart of a process executed by the copy application when a portal button is pressed.

FIG. 18 is a diagram of another example of table information stored in the storage area for the copy application in the HDD.

FIG. 23 is a flowchart of a process executed for deletion of the portal button 4.

DETAILED DESCRIPTION OF THE EMBODIMENTS

The present invention will now be described in detail below with reference to the accompanying drawings showing embodiments thereof.

Figure 1:
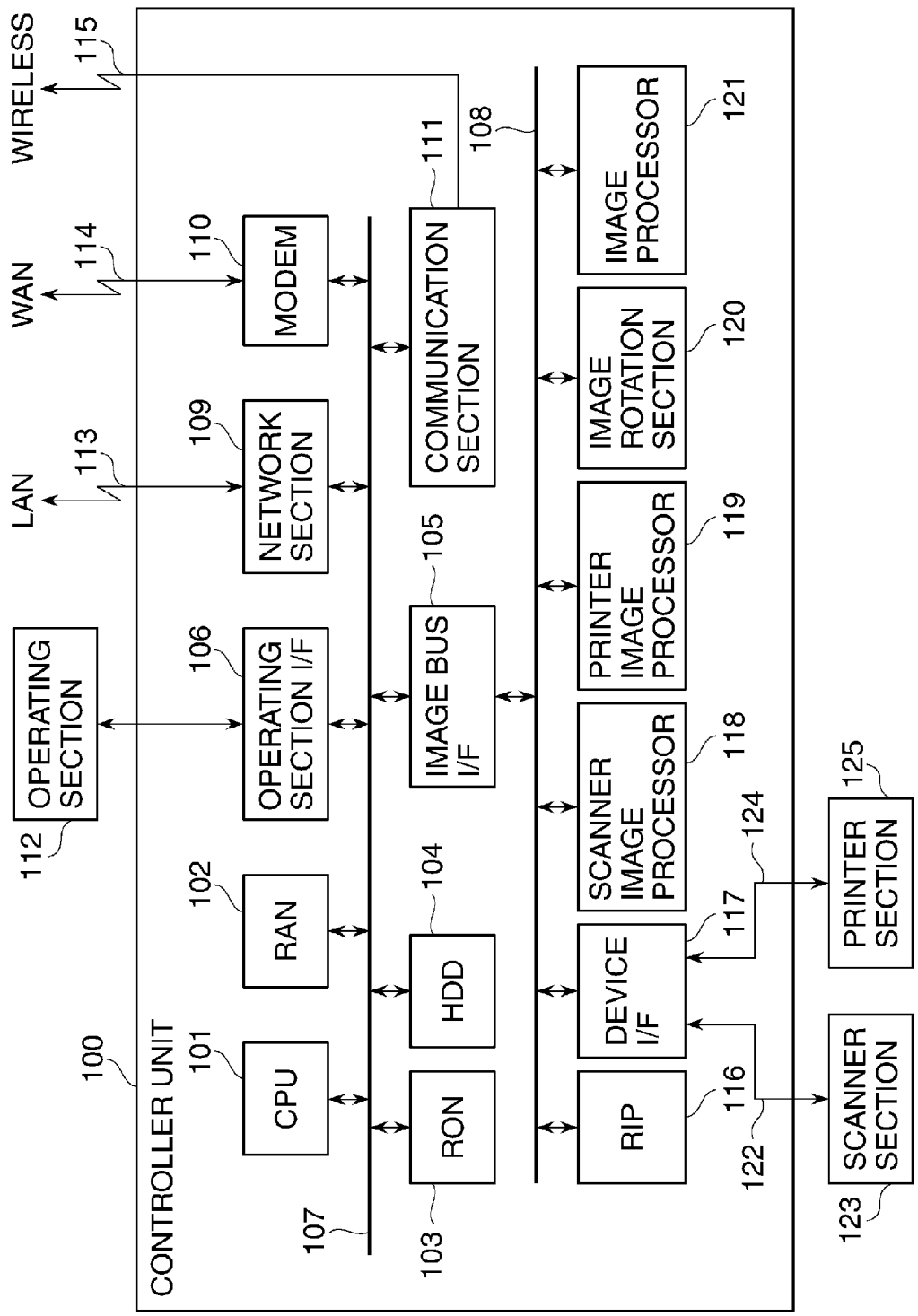
FIG. 1 is a block diagram of an image processing apparatus according to an embodiment of the present invention.

FIG. 1 is a block diagram of an image processing apparatus according to an embodiment of the present invention.

The image processing apparatus shown in FIG. 1 is basically comprised of a controller unit 100 for controlling the overall operation of the image processing apparatus, an operating section 112, a scanner section 123, and a printer section 125. The operating section 112 is comprised of hard keys including ten keys used to enter numerals, for example, and a start key used to start processing, and a liquid crystal touch panel, and provides user interface for an user to operate the image processing apparatus. A user can input settings or information to the image processing apparatus by touching (pressing) icons or buttons displayed on the touch panel of the operating section 112 for representing respective setting items (or by pressing hard keys).

The scanner section 123 reads an image e.g. from an original, as image data. The printer section 125 conveys a recording sheet and prints image data on the recording sheet, as a visualized image.

The controller unit 100 is connected to the scanner section 123 via a bus 122 and is connected to the printer section 125 via a bus 124. Further, the controller unit 100 is connected to other devices or apparatuses via a LAN 113, a public communication line (WAN) 114, and a wireless 115, and controls input and output of image information and device information.

A CPU 101 is a controller for controlling the whole system of the image processing apparatus. A RAM 102 is a system work memory used for operation of the CPU 101. The RAM 102 also functions as an image memory for temporarily storing image data. A ROM 103 is a boot ROM that stores a boot program for the system. An HDD (hard disk drive) 104 stores system software, image data, and information (specifications for wireless communication) on all wireless communications of a communication section 111, referred to hereinafter.

The user can install applications equipped with desired functions in the image processing apparatus to thereby increase the number of functions provided for the image processing apparatus. The installation of an application causes an application program to be stored in the RAM 102 or the HDD 104, for operating associated functions on the image processing apparatus.

An operating section interface (I/F) 106 provides interface for the operating section 112, which is the user interface (UI), and outputs data to the operating section 112 so as to cause the data to be displayed thereon. The operating section interface 106 also plays the role of transferring information input by the user via the operating section 112 to the CPU 101. A network section 109 is connected to the LAN 113, for input and output of information. A modem 110 is connected to the public communication line 114, for input and output of information.

The communication section 111 is connected to the wireless 115 via an antenna, not shown, for input and output of information. Further, the communication section 111 is capable of performing a plurality of types of wireless communications. The above-mentioned devices are connected to a system bus 107.

An image bus interface (I/F) 105 is a bus bridge which connects the system bus 107 to an image bus 108 for use in high-speed transfer of image data, and performs data structure conversion. The image bus 108 is implemented e.g. by a PCI bus or an IEEE 1394.

As one of devices connected to the image bus 108, there is provided a raster image processor (RIP) 116 which expands PDL data into a bitmap image. A device interface (I/F) 117 connects the scanner section 123 and the printer section 125 to the controller unit 100, and performs synchronous-to-asynchronous or asynchronous-to-synchronous conversion of image data.

A scanner image processor 118 performs correction, processing, and editing of input image data. A printer image processor 119 performs correction, resolution conversion, etc. on image data to be printed out, so as to make the image data conformable to the printer section 125. An image rotation section 120 rotates image data. An image processor 121 performs compression/expansion of JPEG, JBIG, MMR, MH, etc. and format conversion processing for PDF, TIFF, OCR, encryption, etc. on image data.

Next, a description will be given, with reference to FIG. 2, of a software configuration for displaying on the operating section 112 the functions and settings of applications installed in the image processing apparatus in FIG. 1.

Figure 2:
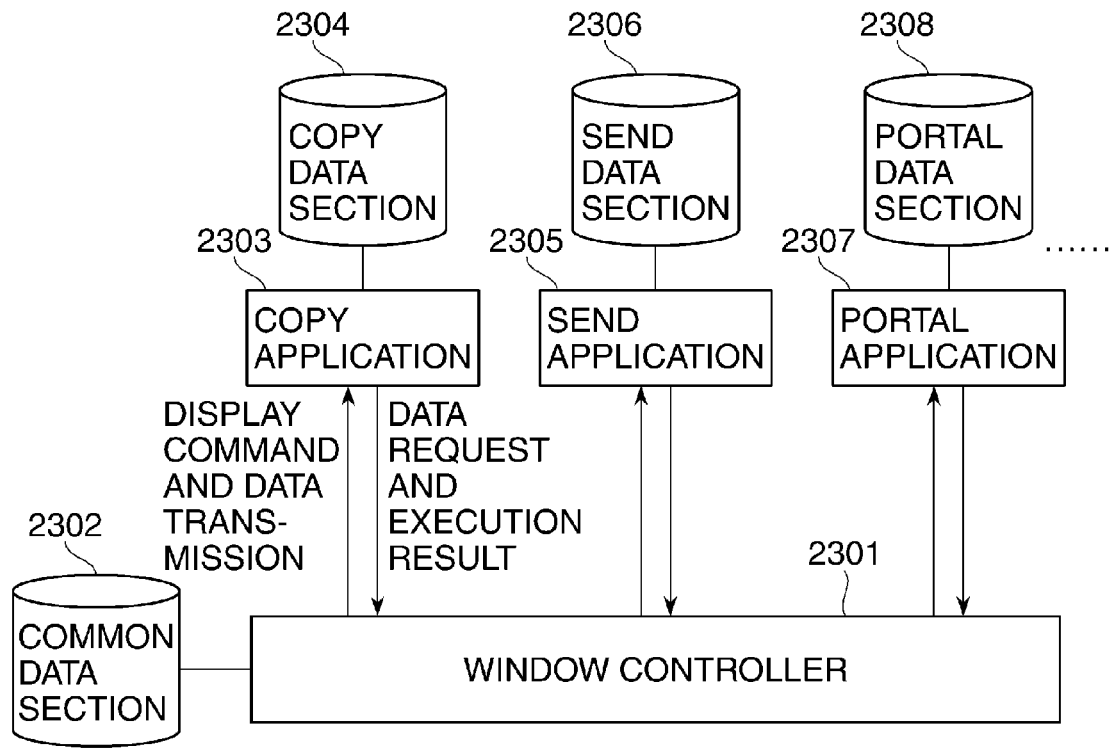
FIG. 2 is a diagram of data and software configuration for displaying the functions and settings of applications to be installed in the image processing apparatus in FIG. 1, on an operating section thereof.

FIG. 2 is a diagram of data and a software configuration for displaying on the operating section 112 the functions and settings of applications installed in the image processing apparatus in FIG. 1.

Applications installed in the image processing apparatus include a copy application 2303 having functions related to copy operation, a send application 2305 having functions related to send operation for transmission/reception of document data, and a portal application 2307 having functions related to a portal. These applications are directly installed in the image processing apparatus by the user, but they may be installed in the image processing apparatus e.g. via the network section 109 or the communication section 111. Each installed application is stored as an application program in the RAM 102 or the HDD 104.

The copy application 2303 and other applications installed in the image processing apparatus in FIG. 1 are each caused to operate independently by an instruction from the CPU 101. To this end, data items to be used by the applications are stored in the HDD 104 in a manner classified into application-specific groups. Data shared by the applications is stored as common data in a common data section 2302 set in the HDD 104.

Further, each of the applications installed in the image processing apparatus in FIG. 1 is assigned an application ID for identifying the application. This application ID is stored as common data in the common data section 2302. In the present embodiment, it is assumed, for example, that an application ID assigned to the copy application 2303 is "100", an application ID assigned to the send application 2305 is "101", and an application ID assigned to the portal application 2307 is "102".

A window controller 2301 determines which of the applications installed in the image processing apparatus is to be displayed on the operating section 112. Data items, such as screen resources and settings, of each of the applications including the copy application 2303 installed in the image processing apparatus are acquired from the HDD 104 and are displayed in response to a command from the window controller 2301. For example, upon reception of a request for displaying the copy application 2303 (application ID "100"), the window controller 2301 determines whether or not it is possible to perform display by a function of the copy application 2303. If it is possible to perform the display, the window controller 2301 sends a display command to the copy application 2303. When there exists setting data for the display, the setting data is also sent together with the display command. The copy application 2303 having received the display command acquires screen resources and settings from a copy data section 2304 set in the HDD 104 and displays these on the operating section 112.

On the other hand, when data to be displayed is not stored in the copy data section 2304, the copy application 2303 sends a data request to the window controller 2301. Upon reception of this data request, the window controller 2301 acquires associated data from the common data section 2302 set in the HDD 104, and sends the acquired data to the copy application 2303. Thus, the copy application 2303 displays the received data.

The send application 2305 is capable of transmitting and receiving send-related data to and from a send data section 2306 set in the HDD 104. Similarly, the portal application 2307 is capable of transmitting and receiving portal-related data to and from a portal data section 2308 set in the HDD 104.

Although in the present embodiment, the image processing apparatus in FIG. 1 is equipped with three kinds of applications, i.e. the copy application, the send application, and the portal application, it may be equipped with other applications.

Figure 3:
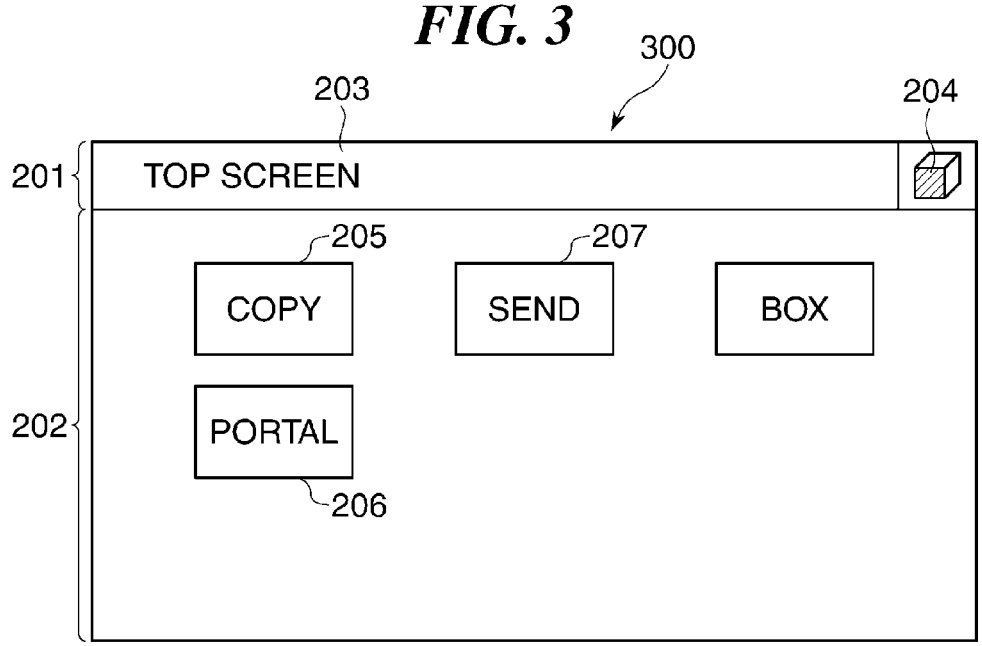
FIG. 3 is a view of an example of a screen displayed on a touch panel of the operating section.

FIG. 3 is a view of an example of a screen displayed on the touch panel of the operating section 112.

The screen displayed on the touch panel of the operating section 112 is comprised of a common area 201 where contents common to all screens are displayed, and a function area 202 where screen-specific contents are displayed, as illustrated in a top screen 300 shown in FIG. 3. The top screen 300 is initially displayed when the image processing apparatus becomes operable after the power is turned on.

The common area 201 is comprised of a title bar 203 explaining a currently displayed screen, and a menu button 204 for displaying a menu for use in registering settings or configuring functions in accordance with the currently displayed screen. In the function area 202, there are displayed application buttons each used to switch the top screen 300 to a screen for using an application associated with the button, such as the copy application or the send application. In the present embodiment, a copy application button 205, a send application button 207, and a portal application button 206 are displayed as the application buttons. When a new application is installed in the image processing apparatus, an application button associated with the new application is displayed in the function area 202 on the top screen 300.

Figure 8:
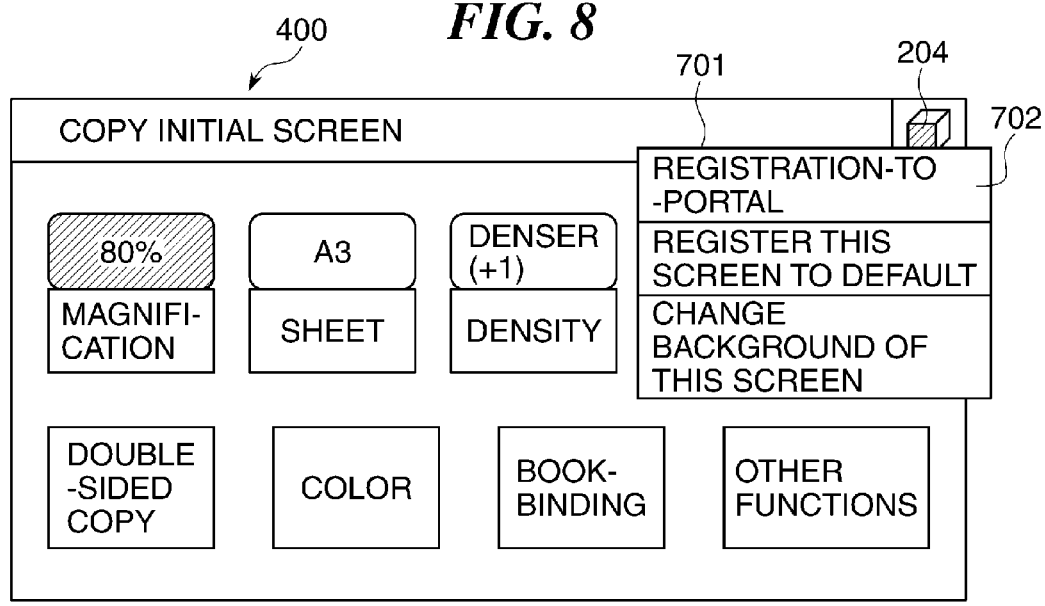
FIG. 8 is a view of an example of a menu list displayed by the copy application.

The menu button 204 is used to display a menu for use in registering settings or configuring functions in accordance with the currently displayed screen. When the menu button 204 is pressed, a menu list 701, described hereinafter with reference to FIG. 8, is displayed. Contents to be displayed in the menu list 701 and an internal process executed by selecting one of the contents are defined by each application on a screen-by-screen basis, and the defined contents are stored in the HDD 104 in association with the respective screens. It should be noted that when there is no content to be displayed in the menu list, the menu button 204 is grayed out to thereby disable user selection.

In the present embodiment, it is assumed that each of the applications except the portal application 2307 unexceptionally defines a menu item "registration-to-portal" to be displayed in the menu list 701, as illustrated in FIG. 8 and a process (registration-to-portal process) associated therewith.

The user can configure various settings on the operating section 112. The settings include, for example, the number of copies, which is input by the user, whether to display an error state during image formation, and book-binding and printing settings determined by a combination of a plurality of configuration operations (these various settings will be hereinafter generically referred to as "settings related to image formation").

The portal application 2307 has a function of storing settings related to image formation as setting information, and accessing and reproducing the stored setting information in response to a user request (this function will be hereinafter referred to as "the accessing and reproducing function"), and a changing/deleting function for changing or deleting stored settings. These functions will be described in detail hereinafter.

In the present embodiment, it is assumed that information items (coordinates, fonts, image resources, default settings, etc.) displayed by each application on an associated screen are all stored in one of the RAM 102, the ROM 103, and the HDD 104. Information items to be displayed on each screen are determined according to the status of the image processing apparatus under the control of the window controller 2301, and then the information items stored in the HDD 104 (or the RAM 102 or the ROM 103) are displayed on the operating section 112 via the operating section interface 106.

When the copy application button 205 is pressed on the top screen 300 shown in FIG. 3, the top screen 300 is switched to a copy initial screen 400 shown in FIG. 4. On the copy initial screen 400, a magnification setting button 301 for setting a magnification, a double-sided copy-setting button 302 for setting double-sided copy, a setting confirmation key 304 for confirming settings configured in the entire copy application, and so forth are displayed in the function area 202. When one of these buttons is pressed, the copy initial screen 400 is switched to an associated configuration screen for configuring copy-related settings, whereby the user is enabled to change the settings.

As for fundamental functions (e.g. magnification) generally used for copying, not only a configuration button but also an associated configured setting is displayed. For example, when a magnification is set, a configured setting (e.g. "100%") is displayed in a set magnification area 303 of the magnification setting button 301.

When the portal application button 206 is pressed on the top screen 300 shown in FIG. 3, the top screen 300 is switched to a portal initial screen 500 shown in FIG. 5. In the function area 202 on the portal initial screen 500, there are displayed user selectable portal buttons 401 and 407 for accessing settings related to image formation stored by the accessing and reproducing function. The displayed portal buttons have the same configuration. For example, the portal button 401 is comprised of an icon 402, a button name 403, and a comment 404 on this button, but this is not limitative.

Portal buttons can be displayed in a manner grouped according to a group type (group classification) selected by a user. When an unselected one of a private button 405 and a shared button 406 is pressed to newly select the same, the screen is switched to display the other group associated with the newly selected button other than the currently displayed group associated with the formerly selected button. In the present embodiment, it is assumed that the shared button 406 is pressed (selected) by default. The shared button 406 is used to display portal buttons for common use by all users.

On the other hand, the private button 405 is used to display portal buttons registered on a private basis. Therefore, user authentication is performed before the top screen 300 is displayed or before the portal initial screen 500 is displayed, and pressing of the private button 405 by an unauthenticated user is disabled. The user authentication in the present embodiment is performed using a general method, such as password authentication or human body authentication, and hence detailed description thereof is omitted.

Next, a description will be given of a control process for displaying the portal initial screen based on a command for displaying the portal initial screen.

Information for displaying portal buttons on the screen is managed and stored in the HDD 104, as table information in which button information, such as icons, button names, and comments, is associated with other information items, as illustrated in FIG. 14. In the table information shown in FIG. 14, an application ID, an action ID, icon information, and button information are associated with a portal button number assigned to a portal button. The icon information includes image data of bitmap format or the like, which can be displayed as an icon, or a path to the image data. The button information includes a button name, a comment, and a group classification. The button name is a content displayed in the button name 403. The comment is a content displayed in the comment 404. The group classification indicates whether registration was performed by pressing the private button 405 or by pressing the shared button 406. When the private button 405 was used for registration, an associated user ID (e.g. "user ID: 0001" appearing in FIG. 14) is also stored in the HDD 104. As the user ID, the same user ID used for user authentication is suitably used. This portal button can be used only by an associated registered user. On the other hand, when the shared button 406 is used for registration, a portal button is registered in the HDD 104 without being linked to a specific user ID. This portal button can be shared by all users. It should be noted that an action ID will be described hereinafter.

Upon detection of a display command for displaying the portal initial screen, the CPU 101 instructs, via the window controller 2301, the portal application 2307 to perform control for displaying portal buttons. In response to this instruction, the portal application 2307 detects in the HDD 104 a group designated for display, and further detects portal buttons belonging to the group. Then, the CPU 101 determines application IDs which are normally operable. Subsequently, respective button information items associated with portal buttons having the respective application IDs normally operable, out of the detected portal buttons, are read out from the HDD 104 and are displayed as portal buttons, respectively (display control). Thus, the portal initial screen 500 as shown in FIG. 5 is displayed on the touch panel of the operating section 112.

When the portal button 401 is pressed, the portal application 2307 executes a process registered in association with the portal button 401. Contents displayed when the menu button 204 is pressed will be described hereinafter.

Next, a description will be given of the registration-to-portal process for registering application-specific settings related to image formation as a portal button.

First, the registration-to-portal process (executed in the illustrated example in association with the copy application) for registering application-specific settings related to image formation as a portal button, using the accessing and reproducing function, will be described with reference to FIG. 6.

Figure 6:
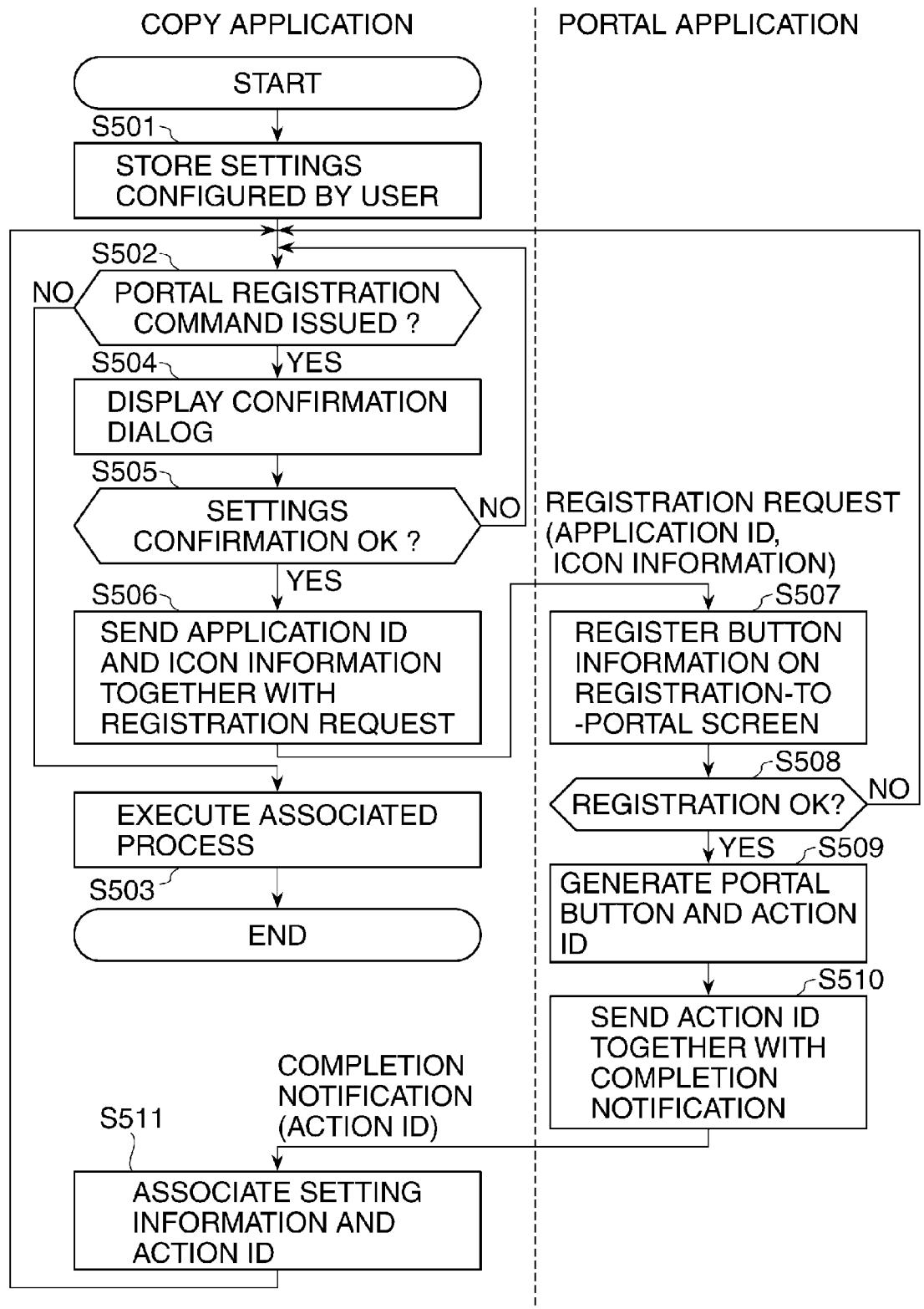
FIG. 6 is a flowchart of a registration-to-portal process.
Figure 7:
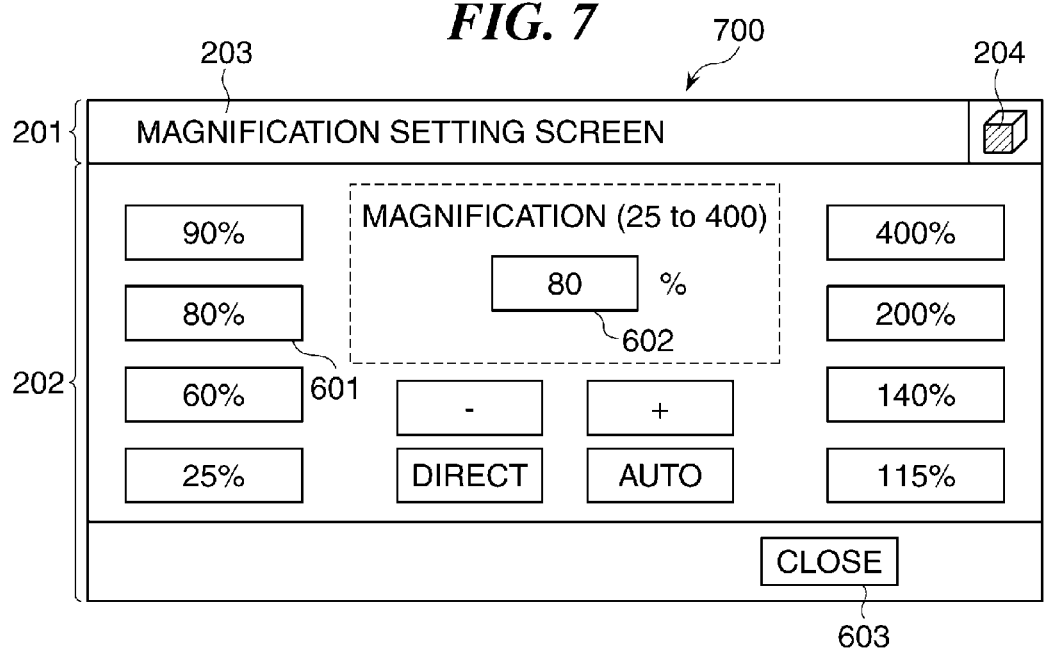
FIG. 7 is a view of an example of a magnification setting screen displayed by a copy application.

FIG. 6 is a flowchart of the registration-to-portal process. In FIG. 6, processing executed by the copy application 2303 is illustrated on the left side, and processing executed by the portal application 2307 on the right side, for clear distinction between the two.

In the registration-to-portal process in the present embodiment, the portal application 2307 acquires information stored in advance in the HDD 104 and user inputs and issues various execution commands using the CPU 101 based on the acquired information. The processing executed by the copy application 2303 or the portal application 2307 is all based on determination by the CPU 101.

Further, when a user touches a screen on the operating section 112, the CPU 101 detects a coordinate position of the touched point on the screen and reads out a processing program associated with the detected coordinate position. Then, the CPU 101 executes the processing program, whereby screen switching and configuration processing are performed. Results of the processing executed in response to commands from the CPU 101 are all stored in the RAM 102 or the HDD 104.

In the following, a case will be described by way of example in which configuration is performed to change the magnification to "80%" and the setting of double-sided copy to "double-sided to double-sided" and the changed settings are registered as a portal button 4.

Upon detecting that the user has pressed the copy application button 205 on the top screen 300 shown in FIG. 3, the CPU 101 switches the top screen 300 to the copy initial screen 400 shown in FIG. 4. Then, the copy application 2303 detects various settings configured by the user for image formation (copying) on the copy initial screen 400 and stores these as setting information in the HDD 104 (step S501).

Now, a description will be given of specific user operations for configuring the settings related to image formation.

When the magnification setting button 301 is pressed on the copy initial screen 400, the copy initial screen 400 is switched to a magnification setting screen 700 shown in FIG.

7. If an 80% button 601 is pressed on the magnification setting screen 700, a set magnification area 602 is set to display "80%". When a close button 603 is pressed in this state, the set magnification is stored in the HDD 104, and the magnification setting screen 700 is switched back to the immediately preceding screen (the copy initial screen 400 in the present example).

Similarly, as for double-sided copy, when the double-sided copy-setting button 302 is pressed on the copy initial screen 400, the copy initial screen 400 is switched to a double-sided copy-setting screen, not shown. The user can perform configuration of double-sided copy e.g. by setting "double-sided to double-sided" on the double-sided copy-setting screen.

Next, a description will be given of a process for registering configured settings as a portal button.

First, when the copy application 2303 detects pressing of the menu button 204, the menu list 701 is displayed on the copy initial screen 400 as shown in FIG. 8 (step S502). Then, when the copy application 2303 detects pressing of a "registration-to-portal" area 702 (YES to the step S502), a registration-to-portal mode is started. On the other hand, when the copy application 2303 detects pressing of any of predetermined areas other than the "registration-to-portal" area 702, an associated process is executed (step S503) without starting the registration-to-portal mode, followed by terminating the present process.

When the registration-to-portal mode is started, the copy application 2303 displays a confirmation dialog 801 on the copy initial screen 400 as a modal dialog as illustrated in FIG. 9 (step S504) and then enters a state awaiting an input from the user (step S505). On the confirmation dialog 801 are displayed settings configured by the user (the set magnification, the set double-sided copy, etc.), a cancel button 802, and an OK button 803.

If the copy application 2303 detects pressing of the cancel button 802 during display of the confirmation dialog 801 (NO to the step S505), the registration-to-portal mode is terminated, and the display screen is switched back to the state before the "registration-to-portal" area 702 was pressed.

On the other hand, if the copy application 2303 detects pressing of the OK button 803 (YES to the step S505), a registration request is issued to the portal application 2307 (step S506). In this case, the copy application 2303 acquires from the HDD 104 its own application ID and icon information to be displayed as a portal button on the portal initial screen, and sends these to the portal application 2307. Information on settings including a magnification is not sent.

Specifically, the copy application 2303 acquires the application ID and the icon information from a storage area (including the common data section 2302 and the copy data section 2304) set in the HDD 104 for the copy application 2303. Then, the copy application 2303 sends these information items to the window controller 2301. The window controller 2301 transfers the information items to the portal application 2307, and the portal application 2307 stores these in a storage area (including the common data section 2302 and the portal data section 2308) set in the HDD 104 for the portal application 2307.

Upon receiving the registration request from the copy application 2303, the portal application 2307 displays a registration-to-portal screen 1000, shown in FIG. 10, for registration of button information (step S507). On the registration-to-portal screen 1000, it is possible to input a button name and a comment to be displayed on the portal button and set a group classification of the portal button. In the present embodiment, it is assumed that "reduced_double-sided copy" is input as the button name, "magnification set to 80%, copy changed to double-sided" is input as a comment, and the group classification of the portal button is set to "shared", as illustrated in FIG. 10.

Then, if the portal application 2307 detects pressing of a cancel button 902 on the registration-to-portal screen 1000, which indicates cancellation of the configuration (NO to a step S508), the portal application 2307 deletes the received application ID and the button information input and set on the registration-to-portal screen, and thereafter the process exits from the registration-to-portal mode.

Specifically, the portal application 2307 deletes the application ID and the button information from the storage area (including the common data section 2302 and the portal data section 2308) set in the HDD 104 for the portal application 2307. Then, a request for displaying the copy application 2303 and information indicative of cancellation of the portal registration are sent to the window controller 2301.

On the other hand, if the portal application 2307 detects pressing of an OK button 901 on the registration-to-portal screen 1000, which indicates completion of the configuration (YES to the step S508), the portal application 2307 executes processing for generating a portal button, based on the settings input and configured on the registration-to-portal screen 1000 (step S509).

In order to generate the portal button, first, the portal application 2307 generates an action ID for uniquely identifying the present registration request (in the present embodiment, serial numbers starting from "1" are assigned to respective applications). Then, the portal application 2307 generates the portal button based on the application ID, the action ID, the icon information, and the button information.

Specifically, the portal button is stored in the storage area set in the HDD 104 for the portal application 2307, according to table information shown in FIG. 11, in which the application ID, the action ID, the icon information, and the button information are associated with each other. The table information shown in FIG. 11 is formed by adding the portal button 4 generated in the above-described registration process to the table information shown in FIG. 14.

Figures 12, 13:
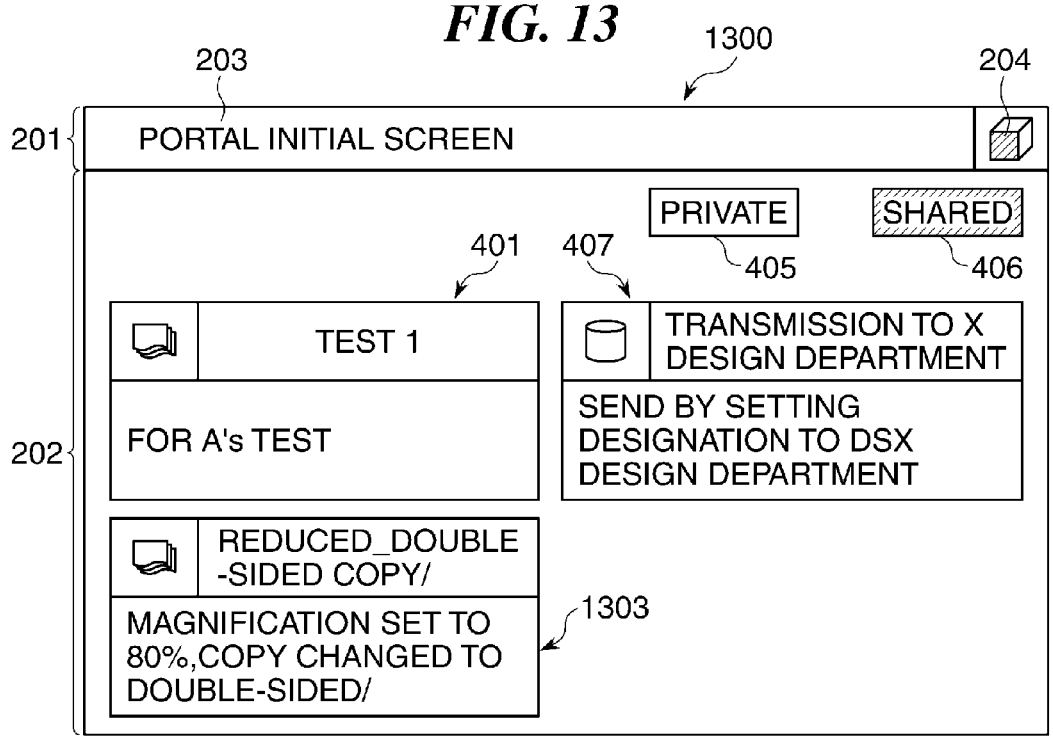
FIG. 12 is a diagram of an example of table information stored in a storage area for a copy application in the HDD.
FIG. 13 is a view of an example of the portal initial screen in which a portal button 4 is registered.

When generation of the portal button is completed, the portal application 2307 sends the generated action ID to the copy application 2303 together with a completion notification (step S510). The copy application 2303 stores the received action ID (call information) in the storage area set in the HDD 104 for the copy application 2303, in association with the settings configured in the step S501 (setting information), and terminates the registration-to-portal mode (step S511). FIG. 12 shows an example of setting information associated with an action ID stored in the storage area set in the HDD 104 for the copy application 2303. In FIG. 12, each action ID is associated with icon information and setting information.

When the registration-to-portal mode is terminated, the copy application 2303 switches the display screen back to the state before the start of the registration mode (step S502).

If the copy application 2303 always uses the same icon, it is not necessary to store the action ID and icon information in association with each other as shown in FIG. 12.

After the table information shown in FIG. 11 is registered, if the portal initial screen is opened, a portal initial screen 1300 shown in FIG. 13 is displayed on the operating section 112. In the function area 202, there are displayed the portal button 401 as a portal button 1, the portal button 407 as a portal button 3, and a portal button 1303 as a portal button 4 registered anew. The default group classification is set to "shared", and hence in the example shown in FIG. 13, a portal button 2 corresponding to a portal button No. 2 in the table information shown in FIG. 11 is not displayed. Only when the private button 405 is pressed, the portal button 2 associated with an authenticated user is displayed.

By execution of the process in FIG. 6, data items of the copy application 2303, which are to be registered in the portal, are held by the copy application 2303 alone, and the portal application 2307 holds only the action ID. In order to execute registered contents from the portal application 2307, it is only required to send an execution command associated with an action ID to an associated application. Therefore, the data can be registered in the portal by the same process irrespective of a data format employed by the application for management of the data.

Although in the present embodiment, the process executed by the copy application 2303 is described by way of example, registration of a portal button can be similarly performed by any other application including the send application.

Next, a description will be given of error handling executed in the FIG. 6 process. It is also possible to notify the user of occurrence of an error e.g. by popping up an error dialog on the operating section 112 during the occurrence of the error.

If the application ID or the icon information cannot be acquired from the HDD 104 in the step S506, the registration-to-portal mode is terminated, and the display screen is switched back to the state before pressing of the "registration-to-portal" area 702.

If the information generated in the step S509 or the information generated in the step S511 cannot be stored in the HDD 104 (e.g. a case where the user is not authorized to write in the HDD 104 or the HDD 104 is full and cannot store any more data), the information is stored in the RAM 102. When the information cannot be stored in the RAM 102, either, the registration-to-process is terminated, and the display screen is switched back to the state before pressing of the "registration-to-portal" area 702 (i.e. the process returns to the step S502).

Also if communication cannot be normally performed in the step S506 or S510, the registration-to-portal process is terminated, and the display screen is switched back to the state before pressing of the "registration-to-portal" area 702 (i.e. the process returns to the step S502).

Next, a description will be given of a process executed by the accessing and reproducing function when a portal button displayed on the portal initial screen is pressed.

Figure 15:
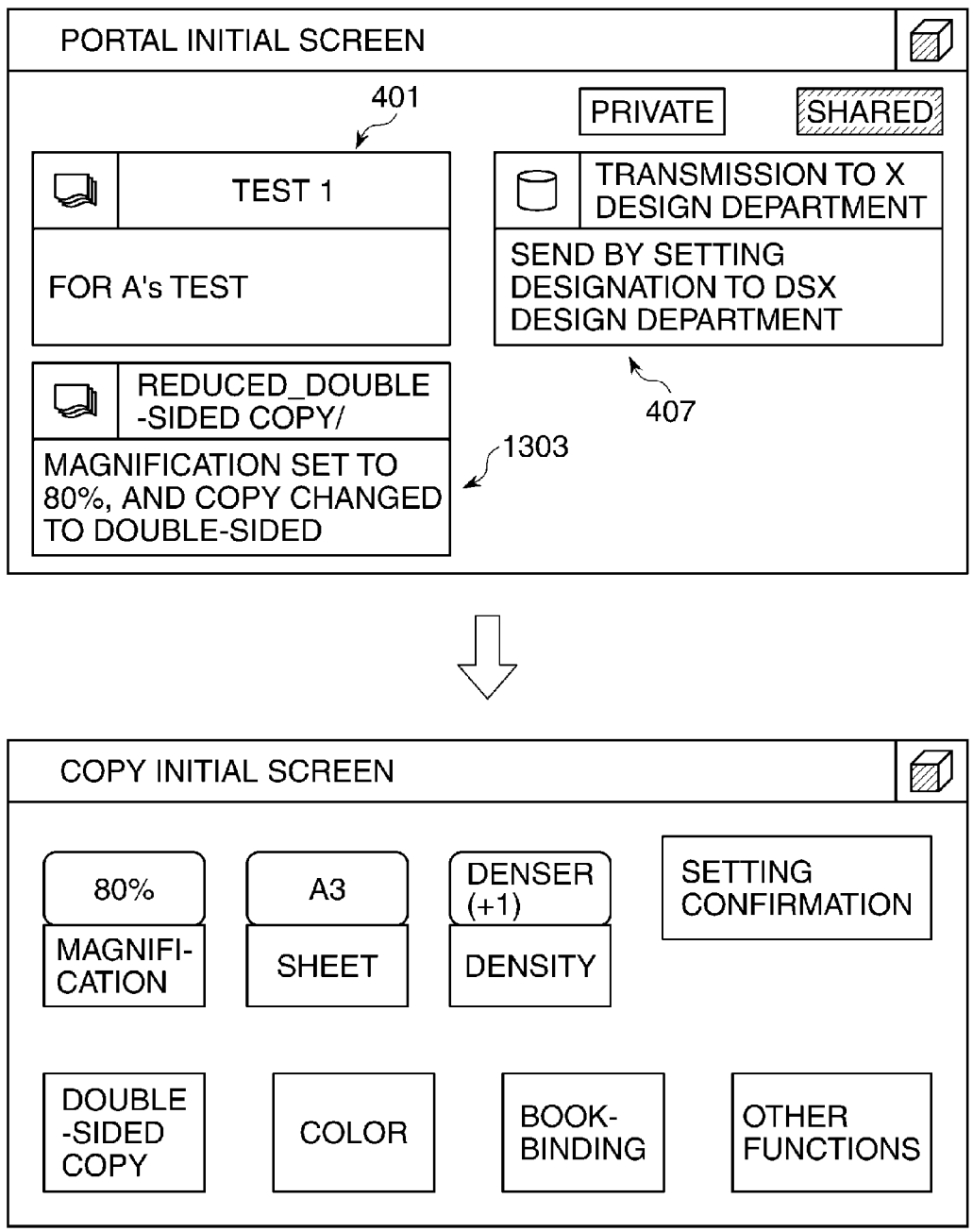
FIG. 15 is a view illustrating an example of how a display screen is switched by pressing of a portal button.

In the present example, it is assumed that the portal button 4 (portal button 1303) is pressed on the portal initial screen 1300 shown in FIG. 13. In response to the pressing of the portal button 4 on the portal initial screen by the user, the CPU 101 executes a process registered in association with the portal button 4 depressed by the user, to thereby cause the display screen to be switched to the copy initial screen, as illustrated in FIG. 15. This process will be described with reference to FIG. 16.

Figure 16:
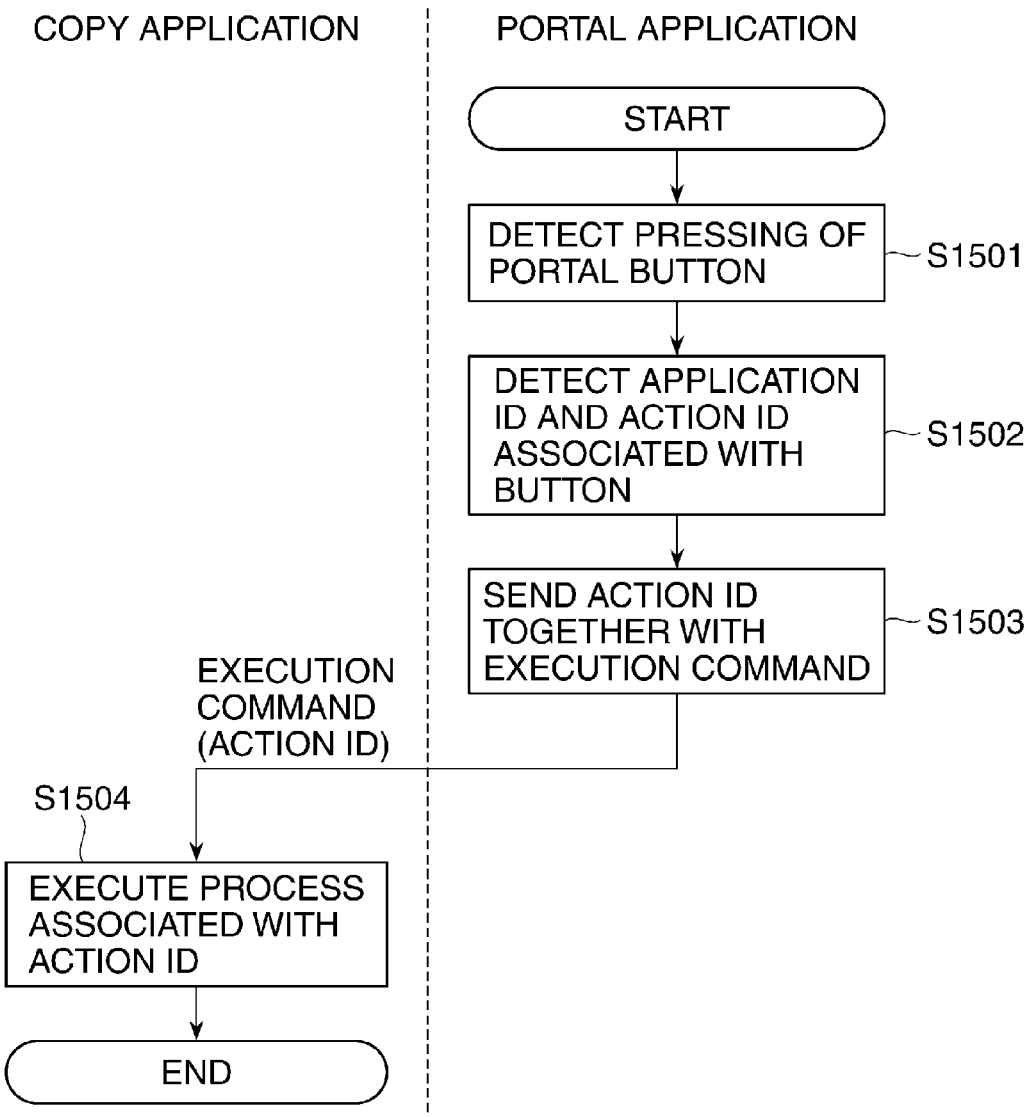
FIG. 16 is a flowchart of a process executed by an accessing and reproducing function when the portal button 4 is pressed.

FIG. 16 is a flowchart of the process executed by the accessing and reproducing function when the portal button 4 is pressed. In FIG. 16, processing executed by the called copy application 2303 is illustrated on the left side, and processing executed by the portal application 2307 on the right side.

The portal application 2307 detects that the portal button 4 has been pressed on the portal initial screen 1300 (step S1501). Then, the portal application 2307 detects an application ID and an action ID associated with the portal button 4 in the HDD 104 (step S1502). At this time, the application ID "100" and the action ID "3" are acquired as the application ID and the action ID associated with the portal button 4 from the FIG. 11 table information stored in the HDD 104.

Then, the portal application 2307 detects in the HDD 104 the copy application 2303 as an application that is to execute the process, based on the acquired application ID, and sends the action ID as an execution command to the copy application 2303 (step S1503). The portal application 2307 thus transmits only the action ID, and therefore irrespective of the data format of data held by an application for executing the process, it is possible to issue an execution command from the portal application.

The copy application 2303 having received the execution command from the portal application 2307 acquires setting information associated with the action ID from the HDD 104 and executes (reflects) the settings (step S1504). In the present embodiment, the copy application 2303 acquires "magnification: 80%" and "double-sided copy: double-sided to double-sided" as the setting information associated with the action ID of 3, and executes the settings. A method of reflecting the acquired setting information will be described with reference to FIG. 17.

FIG. 17 is a flowchart of a process executed by the copy application 2303 when the portal button is pressed.

First, upon reception of the execution command from the portal application 2307 (step S1601), the copy application 2303 acquires copying-related default settings from the HDD 104 and resets the current settings to the default values (step S1602), and then the display screen is switched back to the copy initial screen (step S1603). In doing this, the copy application 2303 overwrites an associated setting information area in the HDD 104 with the setting information associated with the action ID to thereby reflect the setting information on the operating section 112 (step S1604).

Although in the present embodiment, reflection of the setting information after receiving the action ID is achieved by the process shown in FIG. 17, application-specific processes may be executed which are different from each other except that an action ID is sent from the portal application 2307 to an associated application. For example, the step S1602 may not be carried out, and the steps S1603 and S1604 may be replaced by a step for displaying a specific screen on which the setting information associated with the action ID is reflected.

Further, although in the present embodiment, the copy application 2303 stores the setting information in the step S501, an operation flow configured by the user may be stored in place of the setting information. In this case, processing executed by the portal application 2307 is the same as that in the process shown in FIG. 17, but settings stored by the copy application 2303 in association with the action ID are different from those in the process in FIG. 17. For example, not the table information shown in FIG. 12, but table information shown in FIG. 18 is stored in the HDD 104. Instead of executing the step S1604 for reflection of the setting information, the copy application 2303 sequentially executes a sequence of operations stored as the operation flow one by one. For example, in the case of reflecting setting information associated with the action ID of 3, the operation flow is executed by assuming that the user sequentially performs pressing of the magnification setting button, pressing of the 80% button, pressing of the close button, and so on. Of course, this is not limitative, but any other content that can be executed by the copy application 2303 in response to an execution command (including an action ID) from the portal application 2307 can be stored in place of the setting information or the operation flow.

Next, a description will be given of error handling executed in the FIG. 16 process. It is also possible to notify the user of occurrence of an error e.g. by popping up an error dialog on the operating section 112 during the occurrence of the error.

If the application ID or the action ID cannot be acquired in the step S1502 or if a process associated with the action ID cannot be executed, the processing executed by the portal application 2307 is terminated, and the display screen is switched back to the portal initial screen.

Also if the application ID acquired in the step S1502 is associated with an application already deleted or suspended, the processing executed by the portal application 2307 is terminated, and the display screen is switched back to the portal initial screen.

Also if communication is not normally performed in the step S1503, the processing executed by the portal application 2307 is terminated, and the display screen is switched back to the portal initial screen.

Next, a description will be given of processing for editing/deleting a registered portal button.

Figure 19:
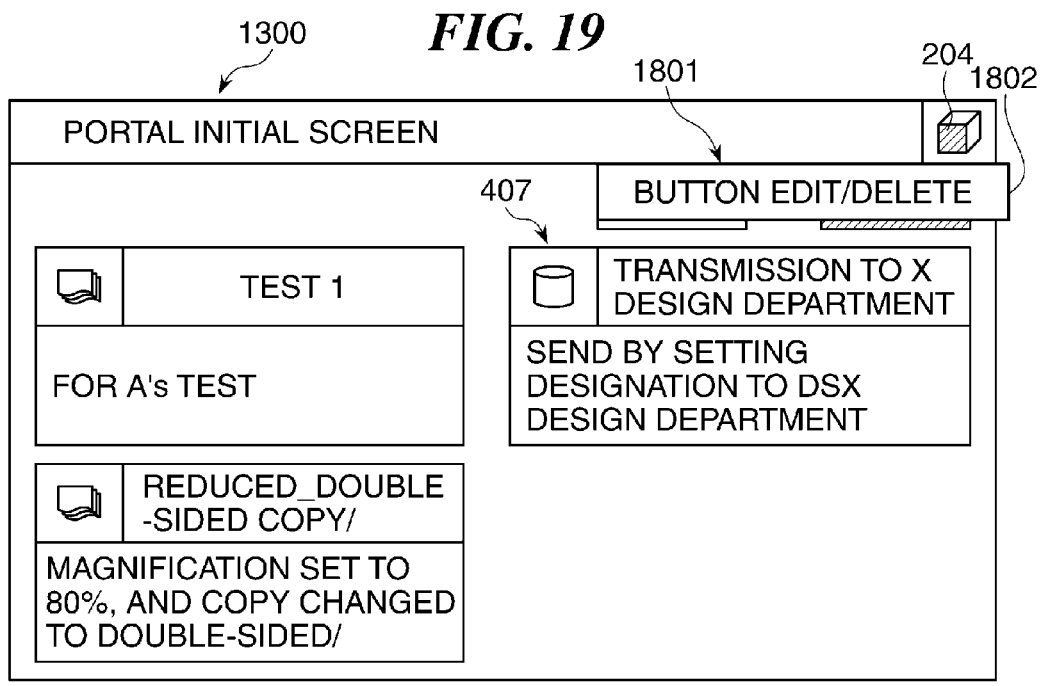
FIG. 19 is a view of an example of the portal initial screen with a menu list displayed thereon by pressing of a menu button.

In editing a registered portal button, first, the portal initial screen is opened, and the menu button 204 is pressed. The pressing of the menu button 204 causes a menu list 1801 to be displayed as shown in FIG. 19. Contents to be displayed when the menu button 204 is pressed ("button edit/delete" in the present example) are stored in advance in the HDD 104. Then, when a "button edit/delete" area 1802 is selected, the portal initial screen 1300 is switched to a portal button edit/delete screen 2000 shown in FIG. 20. On this screen, the menu button 204 is grayed out because nothing is registered therein.

Although in the present embodiment, to edit/delete a portal button, the menu button 204 is pressed on the portal initial screen, and then the "button edit/delete" area 1802 is selected, this is not limitative. For example, after completion of the processing in the step S511 in FIG. 5, the display screen may be automatically switched to the portal button edit/delete screen 2000.

When a portal button to be edited is selected (pressed) and an edit button 1901 is pressed on the portal button edit/delete screen 2000, an edit mode is started. In the following, a description will be given of a case where the edit button 1901 is pressed after pressing of the registered portal button 4.

Figure 21:
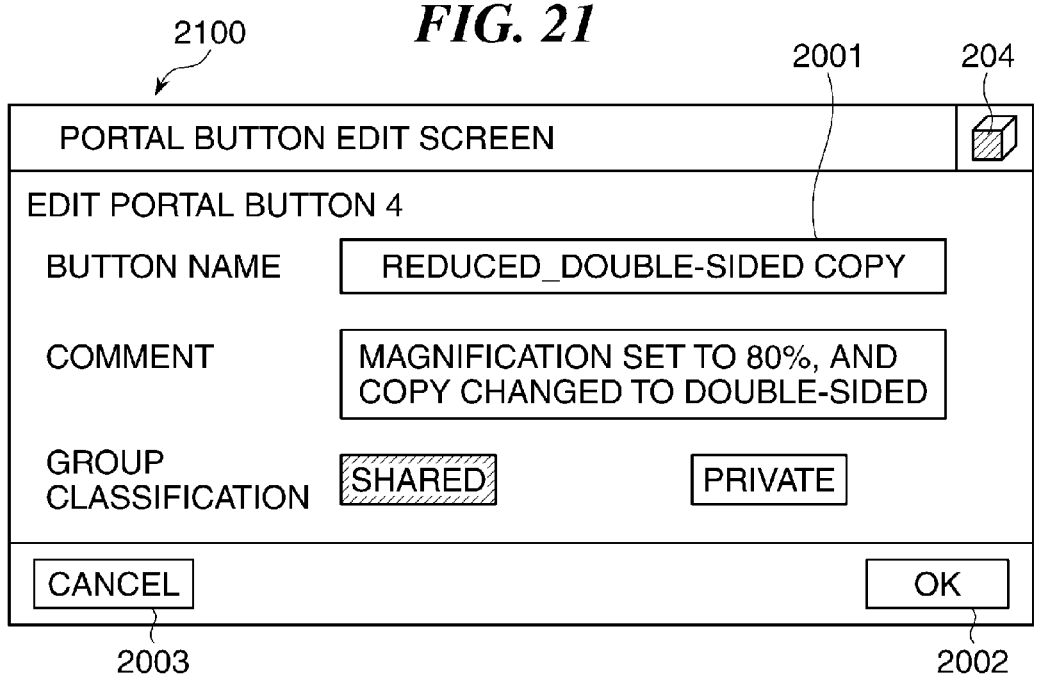
FIG. 21 is a view of an example of a portal button edit screen.

In the edit mode, button information associated with a selected (pressed) portal button is acquired from the HDD 104, and the portal button edit/delete screen 2000 is switched to a portal button edit screen 2100 shown in FIG. 21, based on the acquired button information. In this case, the button information acquired from the HDD 104 is one of the button information items in the table information in FIG. 11, which is associated with the portal button 4 selected by the user.

On the portal button edit screen 2100, it is possible to change (edit) contents registered as button information. In the illustrated example, it is assumed that a soft keyboard, i.e. an on-screen keyboard (not shown) is opened by pressing a button name area 2001, so as to change a button name, and then characters "reduced_double-sided copy 2" are entered, followed by closing the soft keyboard. In this case, a content displayed in the button name area 2001 is changed from "reduced_double-sided copy" to "reduced_double-sided copy 2". Then, when an OK button 2002 is pressed, the portal application 2307 rewrites the new content into the HDD 104, followed by terminating the edit mode. After termination of the edit mode, the portal button edit/delete screen is displayed on which the edited content is reflected.

On the other hand, when not the OK button 2002, but a cancel button 2003 is pressed, input operations performed after the start of the edit mode are all canceled, and the edit mode is terminated, displaying the portal button edit/delete screen 2000.

Although in the present embodiment, an item for editing icon information is not displayed on the portal button edit screen 2100 shown in FIG. 21, it is also possible to edit icon information in the edit mode.

Figure 20:
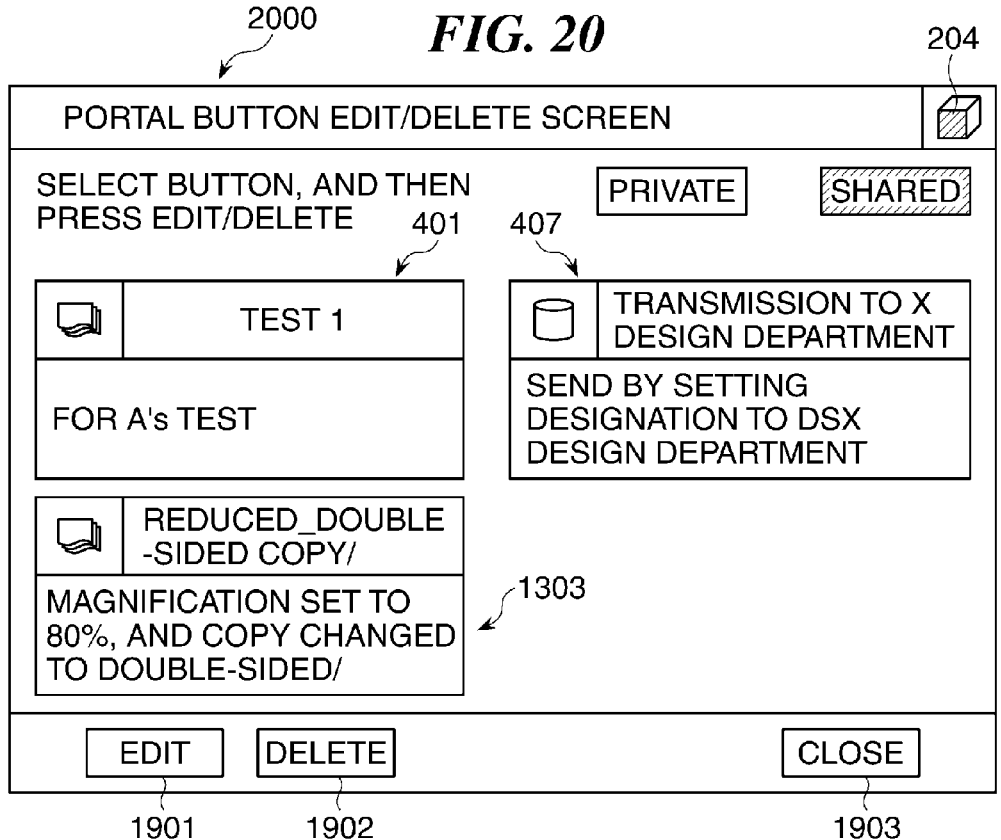
FIG. 20 is a view of an example of a portal button edit/delete screen.

In deleting a registered portal button, a portal button to be deleted is selected (pressed) on the portal button edit/delete screen 2000 shown in FIG. 20, and then a delete button 1902 is pressed to start a delete mode. In the following, a description will be given of a case where the delete button 1902 is pressed after pressing of the registered portal button 4.

Figure 22:
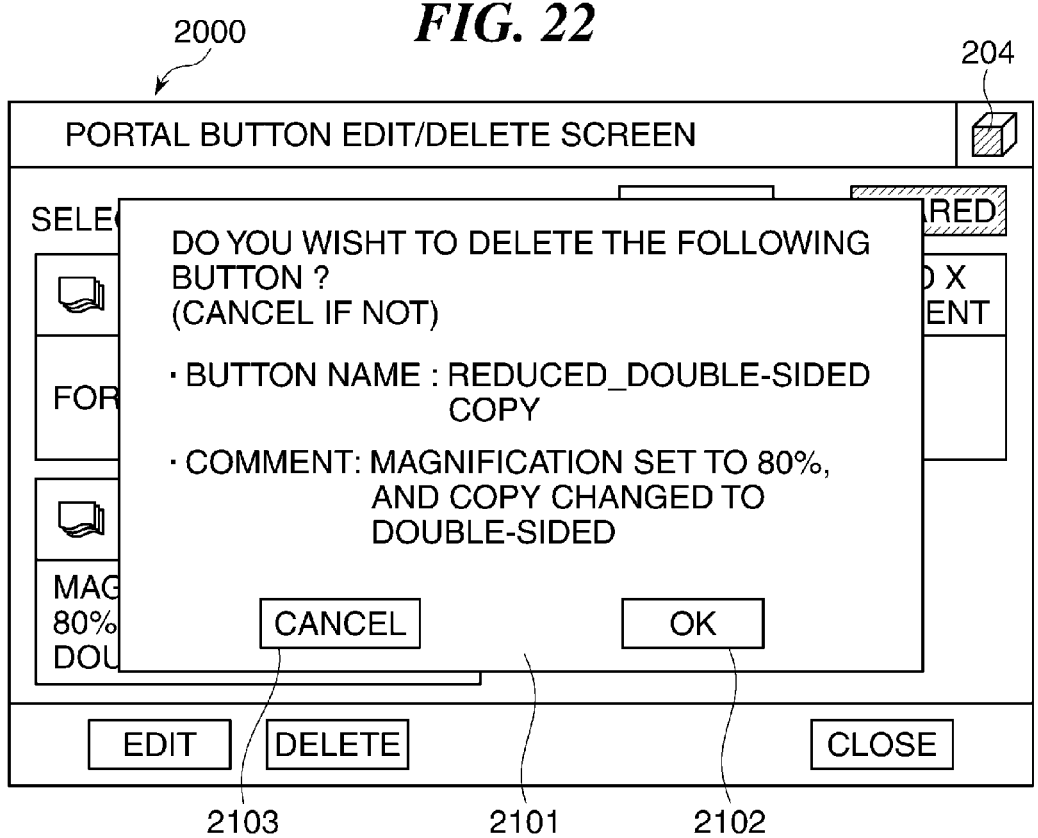
FIG. 22 is a view of an example of a confirmation dialog displayed on the portal button edit/delete screen.

In the delete mode, a confirmation dialog 2101 shown in FIG. 22 is popped up on the portal button edit/delete screen 2000. When a cancel button 2103 is pressed on the confirmation dialog 2101, operations performed after the start of the delete mode are all cancelled, and the delete mode is terminated. Then, the confirmation dialog 2101 is closed, and the portal button edit/delete screen 2000 is displayed.

On the other hand, when an OK button 2102 is pressed on the confirmation dialog 2101, the selected portal button 4 is deleted, followed by the delete mode being terminated. After termination of the delete mode, the portal button edit/delete screen 2000 is displayed on which the deletion of the content is reflected.

Next, a process executed for deletion of the portal button 4 will be described in detail with reference to FIG. 23.

FIG. 23 is a flowchart of the process executed for deletion of the portal button 4. In FIG. 23, processing executed by the copy application 2303 is shown on the left side, and processing executed by the portal application 2307 on the right side.

First, the portal application 2307 detects execution of deletion (i.e. pressing of the OK button 2102) by the user, and acquires from the HDD 104 an application ID and an action ID associated with a portal button to be deleted (step S2201). Then, the portal application 2307 sends the action ID to an application associated with the acquired application ID, together with a delete command (step S2202). In the present embodiment, the portal application 2307 instructs the copy application 2303 to delete contents of the action ID of 3.

The copy application 2303 having received the instruction detects in the HDD 104 setting information associated with the action ID and deletes from the HDD 104 the action ID and the setting information (which may include icon information) associated with the action ID (step S2203). Thereafter, the copy application 2303 notifies the portal application 2307 of completion of the deletion (step S2204).

Upon reception of the notification of completion of the deletion, the portal application 2307 deletes information on the portal button (the portal button number, the application ID, the action ID, the icon information, the button information, etc.) (step S2205). Thus, the information associated with the portal button is deleted.

Next, a description will be given of error handling in the FIG. 23 process. It is also possible to notify the user of occurrence of an error e.g. by popping up an error dialog on the operating section 112 during the occurrence of the error.

If an application ID or an action ID associated with a portal button cannot be acquired in the step S2201, or if information associated with an action ID cannot be deleted, the delete processing in the step S2205 is not executed.

If communication is not normally performed in the step S2202, the delete processing in the step S2205 is not executed, either.

According to the above-described embodiment, setting information items each set via the operating section 112 and action IDs for accessing the respective setting information items are stored in the HDD 104 in association with each other. Further, the action IDs and button information items corresponding to the respective action IDs are stored in the HDD 104 in association with each other. The button information items are displayed on the operating section 112, as respective portal buttons selectable by the user. When the user selects a desired one of the portal buttons, an action ID associated with the portal button is detected in the HDD 104. Further, one of the setting information items, which is associated with the action ID, is acquired from the HDD 104 based on the action ID, and the acquired setting information is executed or reflected. This makes it possible to realize easy accessing of registered information on any function. Further, since it is not required to parse a script or the like, accessing can be performed at a high speed. Furthermore, it is possible to provide a user interface having high operability.

Although in the above-described embodiment, the present invention is applied to an image processing apparatus by way of example, this is not limitative, but the present invention can also be applied to an information processing apparatus, such as a personal computer, or a portable terminal unit.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to the embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-287768, filed Nov. 10, 2008, which is hereby incorporated by reference herein in its entirety.

What is claimed is:

1. An image processing apparatus,
   an operation unit;
   a display unit;
   a first storage unit configured to store portal application information comprising (a) setting information configured via the operation unit and (b) access information for accessing the setting information, the first storage unit being configured to store the setting information and the access information in the portal application information in association with each other;
   a second storage unit configured to store other application information comprising the access information and button information, the second storage unit being configured to store the access information and the button information in the other application information in association with each other;
   a display control unit configured to display the button information on the display unit in a user selectable form;
   an access information-detecting unit configured to be operable when the button information displayed on the display unit is selected by a user, to detect the access information associated with the button information in said second storage unit;
   a setting information acquisition unit configured to acquire the setting information associated with the access information from said first storage unit, based on the access information detected by said access information-detecting unit; and
   an execution unit configured to execute image processing based on the setting information acquired by said setting information acquisition unit,
   wherein the other application information is accessible to an application other than the portal application, but is not accessible to the portal application,
   wherein the portal application information is accessible to the portal application, but is not accessible to the other application,
   wherein the access information-detecting unit is implemented at least by a processing device executing the portal application and not the other application, and
   wherein the setting information acquisition unit and the execution unit are implemented at least by a processing device executing the other application and not the portal application.

2. The image processing apparatus according to claim 1, wherein said display control unit includes an edit/delete unit configured to change or delete button information to be displayed on the display unit.

3. The image processing apparatus according to claim 1, wherein said display control unit is configured to display user selectable buttons on the display unit in association with respective items of the button information stored in said second storage unit.

4. The image processing apparatus according to claim 1, further comprising a user authentication unit configured to perform user authentication, and
   wherein said display control unit is configured to change button information to be displayed on the display unit, according to a user authenticated by said user authentication unit.

5. The image processing apparatus according to claim 1, wherein the setting information stored in said first storage unit includes settings on an application installed in the image processing apparatus, information input by the user, and an operation flow configured by the user.

6. The image processing apparatus according to claim 1, wherein the button information stored in said second storage unit includes a button name, a comment, icon information, and a group classification selected by the user.

7. A method of controlling an image processing apparatus including an operation unit and a display unit, the method comprising the steps of:
   storing, in a first storage step, portal application information in a first storage unit, the portal application information comprising (a) setting information configured via the operation unit and (b) access information for accessing the setting information, the first storage step storing the setting information and the access information in the portal application information in association with each other in the first storage unit;
   storing, in a second storage step, other application information in a second storage unit, the other application information comprising the access information and button information, the second storage step storing the access information and the button information in association with each other in the second storage unit;
   displaying the button information on the display unit in a user selectable form;
   detecting, when the button information displayed on the display unit is selected by a user, the access information associated with the button information in the second storage unit;
   acquiring the setting information associated with the access information from the first storage unit, based on the detected access information; and performing image processing based on the acquired setting information, wherein the other application information is accessible to an application other than the portal application, but is not accessible to the portal application, wherein the portal application information is accessible to the portal application, but is not accessible to the other application, wherein the detecting step is executed at least by a processing device executing the portal application and not the other application, and wherein the acquiring step and the performing step are implemented at least by a processing device executing the other application and not the portal application.

8. A non-transitory computer-readable storage medium storing a computer-readable program for causing a computer to execute a method of controlling an image processing apparatus including an operation unit and a display unit, wherein the method comprises the steps of:

storing, in a first storage step, portal application information in a first storage unit, the portal application information comprising (a) setting information configured via the operation unit and (b) access information for accessing the setting information, the first storage step storing the setting information and the access information in the portal application information in association with each other in the first storage unit;

storing, in a second storage step, other application information in a second storage unit, the other application information comprising the access information and button information, the second storage step storing the access information and the button information in association with each other in the second storage unit;

displaying the button information on the display unit in a user selectable form;

detecting, when the button information displayed on the display unit is selected by a user, the access information associated with the button information in the second storage unit;

acquiring the setting information associated with the access information from the first storage unit, based on the detected access information; and performing image processing based on the acquired setting information, wherein the other application information is accessible to an application other than the portal application, but is not accessible to the portal application, wherein the portal application information is accessible to the portal application, but is not accessible to the other application, wherein the detecting step is executed at least by a processing device executing the portal application and not the other application, and wherein the acquiring step and the performing step are implemented at least by a processing device executing the other application and not the portal application.

* * * * *